OR 4,163,215

United States Patent [19]

Iida

[11] 4,163,215

[45] Jul. 31, 1979

[54] SAFETY LOCK SYSTEM FOR CONTROLLING ACCESS TO AN AREA IN RESPONSE TO PREDETERMINED DATA INPUTS

[75] Inventor: Makoto Iida, Tokyo, Japan

[73] Assignee: Security Patrols Co., Ltd., Tokyo, Japan

[21] Appl. No.: 810,759

[22] Filed: Jun. 28, 1977

[30] Foreign Application Priority Data

Jun. 30, 1976 [JP] Japan .................................. 51-78406

[51] Int. Cl.[2] ............................................... H04Q 9/00

[52] U.S. Cl. ............................. 340/149 A; 340/147 R

[58] Field of Search ....................... 340/147 R, 149 A; 235/61.7 B; 194/13; 222/2

[56] References Cited

U.S. PATENT DOCUMENTS

| | | | |
|---|---|---|---|
| Re. 29,057 | 11/1976 | Enikeieff | 340/149 A |
| 3,931,497 | 1/1976 | Gentilie | 340/149 A |
| 3,937,925 | 2/1976 | Boothyrood | 340/149 A |
| 3,941,977 | 3/1976 | Voss | 340/149 A |

*Primary Examiner*—Harold I. Pitts

*Attorney, Agent, or Firm*—Armstrong, Nikaido, Marmelstein & Kubovcik

[57] ABSTRACT

Herein disclosed is a safety lock system which includes an electric lock mounted on a gateway to a certain region, a card reader, a display device and a main controller. The main controller is arranged so that it can check the card data read by the card reader. Accordingly, when the card data are in agreement with the predetermined data, the main controller feeds a locking or unlocking drive signal to the electric lock. On the contrary, when the card data are not in agreement with the predetermined data, the main controller emits a first alarm signal to the display device. Furthermore, when the main controller receives a normal operation signal from the electric lock, the main controller emits a signal of confirmation of the normal operation of the electric lock to the display device; whereas when the main controller does not receive the normal operation signal, it emits a second alarm signal to the display device.

22 Claims, 18 Drawing Figures

SAFETY LOCK SYSTEM FOR CONTROLLING ACCESS TO AN AREA IN RESPONSE TO PREDETERMINED DATA INPUTS

BACKGROUND OF THE INVENTION

The present invention relates to a safety lock system for performing locking of a door or gateway to a certain region such as an ordinary house, an office room and the like and for maintaining security in that certain region.

Various door locking devices are known, but as they only consist of locks mounted on doors to be opened by locks, they therefore cannot comprehensively ensure the security and safety in the regions within the doors or gateways.

It is therefore a primary object of the present invention to provide a safety lock system which can detect and confirm various conditions of a door, for example, the locked state, the unlocked state, the opened state and the abnormal state, and which can make inspections for maintaining the safety in a region within the door.

Another object of the present invention is to provide a safety lock system which can automatically intercept or restore an electric system or gas system in a region within a door depending on states of the door or whether or not people are present in the region.

Still another object of the present invention is to provide a safety lock system which can record the entrance of people into a region within a door or exit of people from the region and which can prohibit unauthorized people from entering into the region within the door. The above-mentioned objects can be achieved by using the safety lock system which comprises an electric lock mounted on a gateway to a certain region, a card reader, a display device and a main controller, such main controller being arranged so that it can check the card data read by the card reader. When the card data are in agreement with the predetermined data, the main controller feeds a locking or unlocking drive signal to the electric lock. On the other hand, when the card data are not in agreement with the predetermined data, the main controller emits a first alarm signal to the display device. In addition, when the main controller receives a normal operation signal from the electric lock, the main controller emits a signal of confirmation of the normal operation of the electric lock to the display device; whereas when the main controller does not receive the normal operation signal, it emits a second alarm signal to the display device.

BRIEF DESCRIPTION OF THE DRAWINGS

Further features and advantages of the present invention will be apparent from the ensuing description with reference to the accompanying drawings; which drawings do not limit the scope of the invention in any way.

FIG. 1, which includes

DESCRIPTION OF THE PREFERRED EMBODIMENT

Figure 1A:
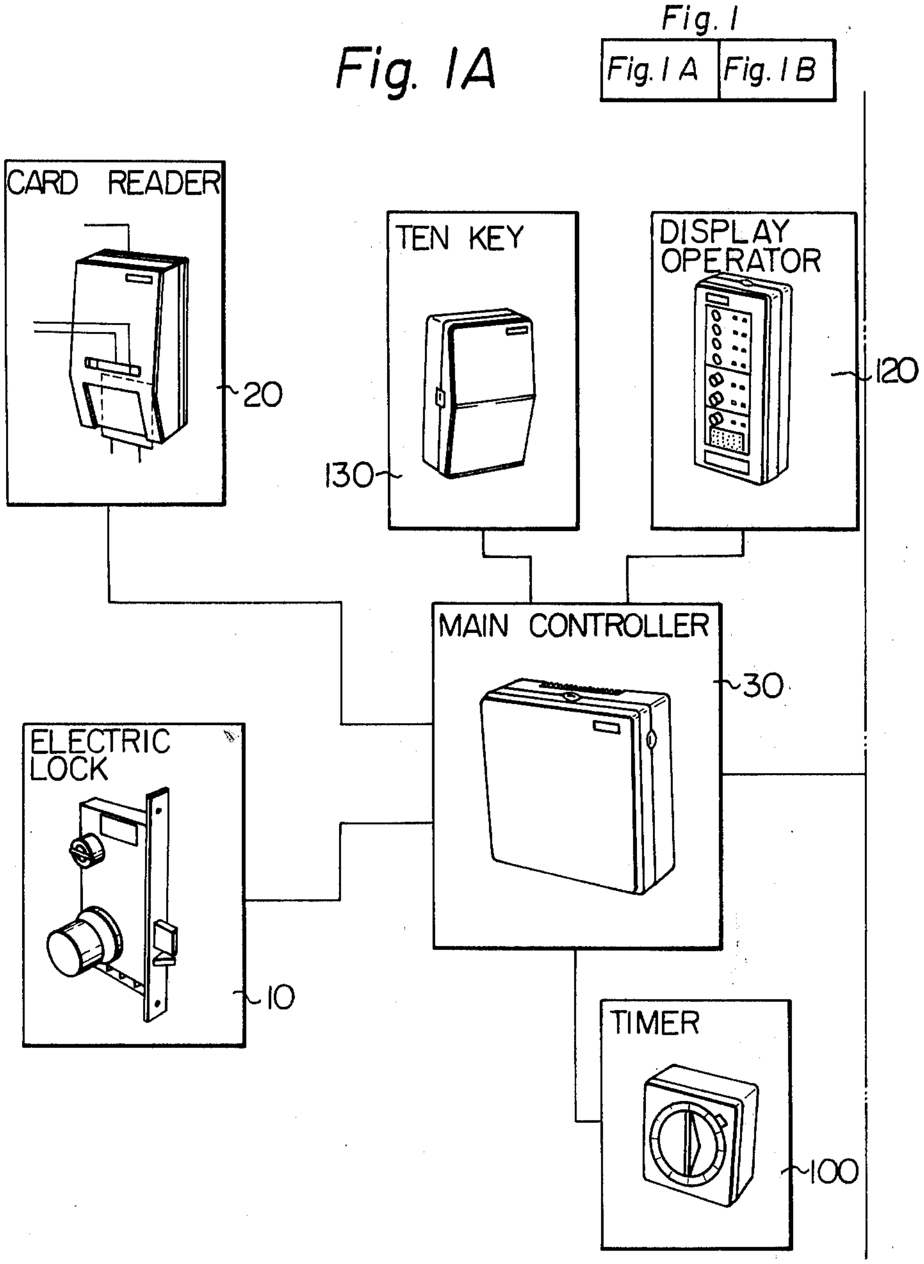
FIG. 1A and FIG. 1B, is a block diagram illustrating in a broad outline one embodiment of the safety lock system according to the present invention.
Figure 1B:
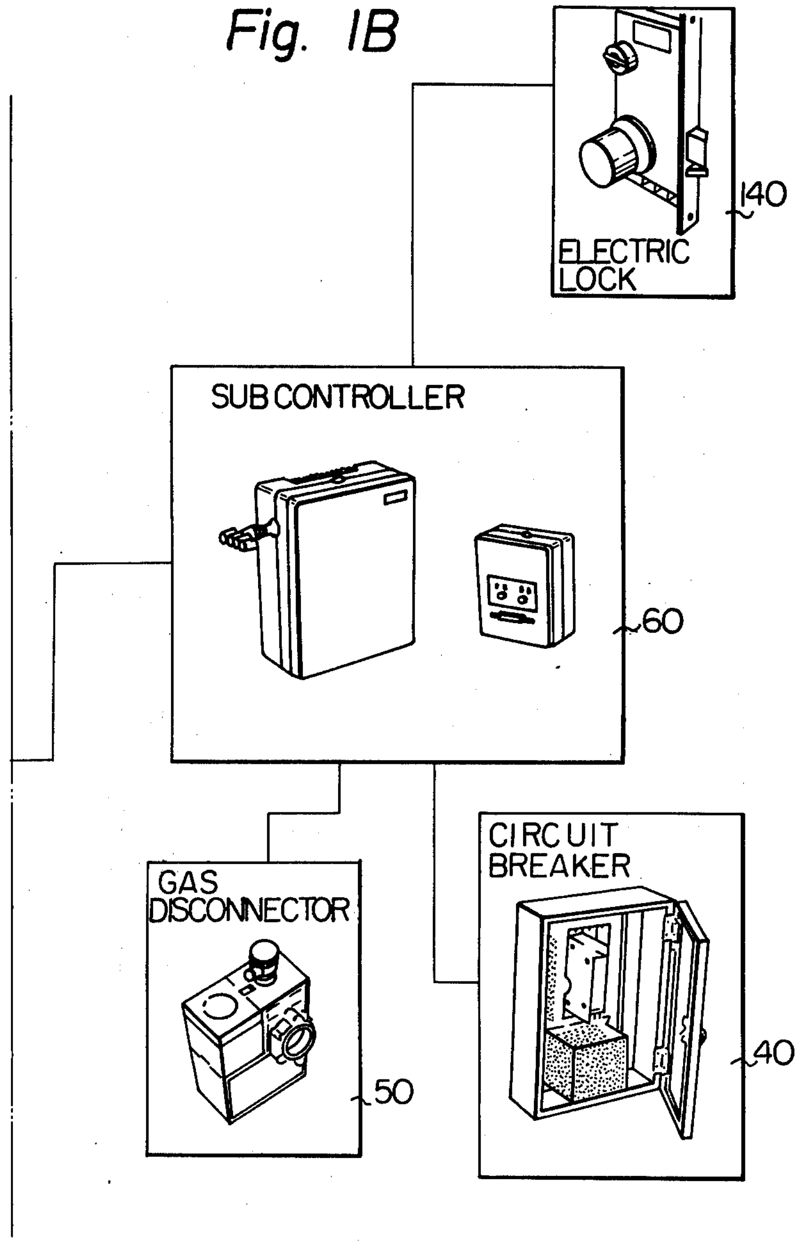

Referring to FIG. 1, the safety lock system of the present invention can display and confirm the state of a door, for example, the locked state, and can automatically intercept and restore electric and gas systems in a region within the door in response to the operations of locking and unlocking the door.

This safety lock system comprises as main constituent members an electric lock 10 mounted on a door or gateway to a certain region, a card reader 20 as a key data input device that can be operated by a person wanting to enter into that region, a main controller 30 associated with the electric lock 10 and a card reader 20 for controlling the operations as described hereinafter, a circuit breaker 40 for intercepting and restoring an electric system in the region, a gas disconnector 50 for intercepting and restoring a gas system in the region, and a subsidiary controller 60 associated with the main controller 30, a circuit breaker 40 and a gas disconnector 50 for controlling their operations as described hereinafter.

Any electric lock can be used as the electric lock 10 in the present invention as long as it can be locked or unlocked upon receipt of a locking or unlocking electric drive signal.

The card reader 20 is operated by authorized persons coming into and going out of the region within the door. When a magnetic card possessed by an authorized person is inserted into a prescribed position and is taken out therefrom, the card reader 20 exercises functions of reading out recorded data on the card and displaying an external signal through a speaker and a luminous diode or the like. For example, a card reader having a structure as shown in the block diagram of FIG. 2 is preferably employed.

Figure 2:
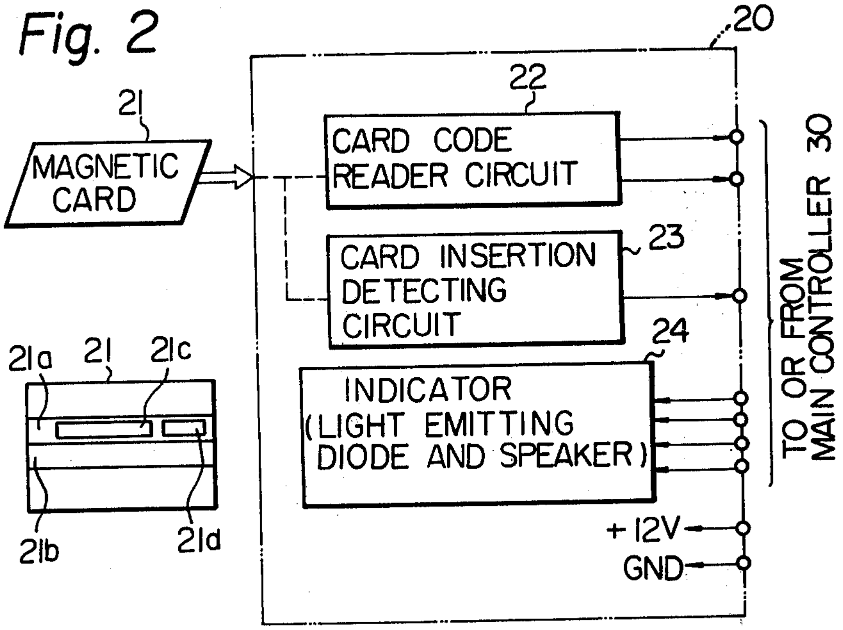
FIG. 2 is a block diagram illustrating one embodiment of the card reader that is used in the safety lock system of the present invention.

In the card reader shown in FIG. 2, when a magnetic card 21 is inserted into a prescribed position and taken out therefrom, recorded data on the card are read out by a card code reader circuit 22, and insertion of the card is detected by a card insertion detecting circuit 23. The magnetic card 21 has two magnetic strips 21*a* and 21*b*. The information data are recorded on the magnetic strip 21*a*, and the clock signal is recorded on the magnetic strip 21*b*. The information data include a user code 21*c* and a person discriminating code 21*d*. These signals are fed to the main controller 30. Insertion and take-out of the card are performed smoothly at constant speeds. It is preferred that it is possible to read out recorded data while the card take-out speed is in the range of from 5 to 80 cm/sec. A display zone including a luminous diode, a speaker and the like is disposed in the card reader so that the diode is lighted or the speaker is actuated according to a signal from the main controller 30 (this feature will be described in detail hereinafter with reference to the main controller 30).

The main controller 30 is a main controlling apparatus of the safety lock system of the present invention. In accordance with the basic aspect, the main controller 30 is connected to the card reader 20 and the electric lock 10 and receives recorded data on the card read-out via the card reader 20 and emits a locking or unlocking drive signal to the electric lock 10 depending on the received data. When the functions of the safety lock system are expanded, as detailed hereinafter, such members as subsidiary controllers 60 and 90, a timer 100, a display operator 120 and a ten-key device 130 are connected to the main controller 30 so that the main controller 30 can emit signals to these members and process signals sent from these members.

Figure 3A:
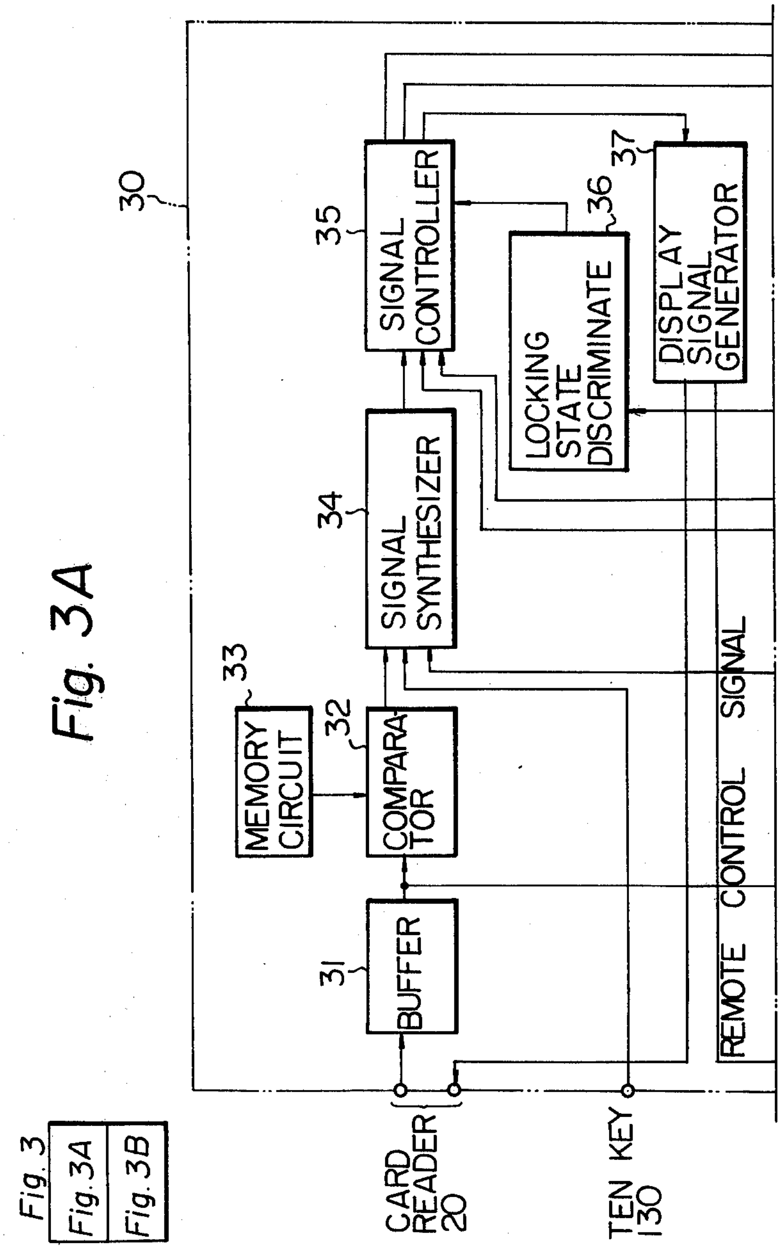
FIG. 3, which includes FIG. 3A
FIG. 3B is a block diagram illustrating one embodiment of the main controller that is used in the safety lock system of the present invention.
Figure 3B:
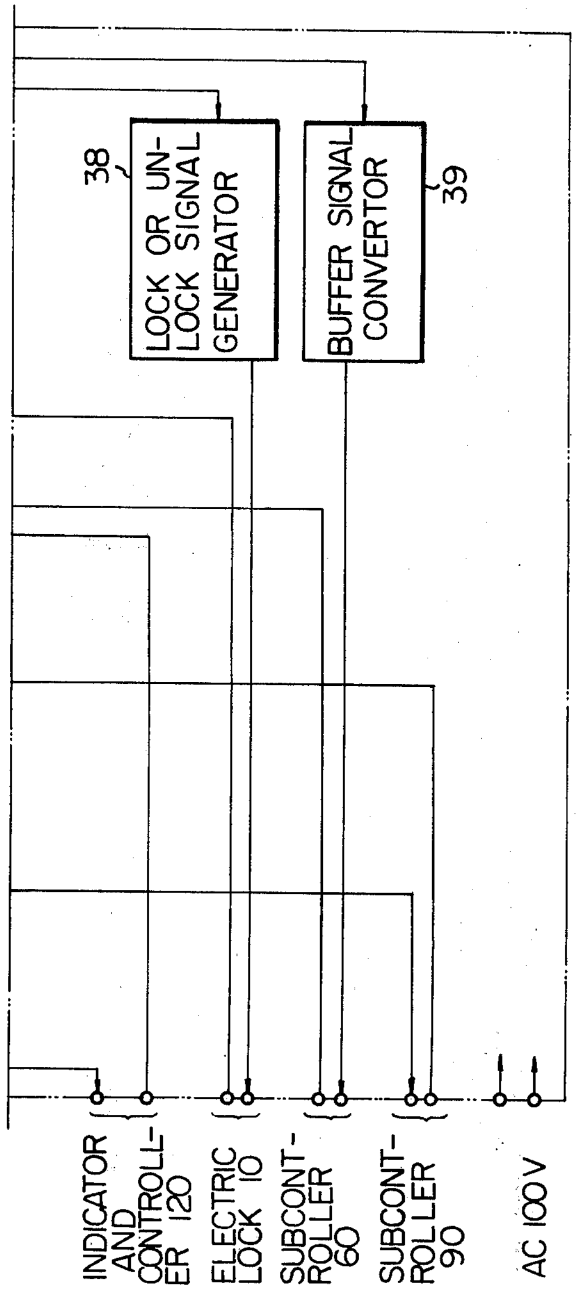

As shown in the block diagram of FIG. 3, for example, the main controller 30 is arranged so that the main controller 30 can receive recorded data on the card read out by the card reader 20 at a comparator 32 through a buffer signal relay circuit 31 and can check and compare the received data with data stored in a memory circuit 33 at the comparator 32, and that when both sets of data are in agreement with each other, the main controller 30 emits a locking or unlocking drive signal to the electric lock 10 through a signal synthesizing circuit 34, a signal controlling circuit 35 and a locking or unlocking signal generating circuit 38. When the electric lock 10 is normally operated by the above-mentioned drive signal, the main controller 30 receives a normal operation signal from the electric lock 10 and emits a signal of confirmation of the normal operation of the electric lock to the display zone 24 of the card reader 20 through a key state discriminating circuit 36, a signal controlling circuit 35 and a display signal generating circuit 37 to light, for example, a green lamp of the display zone 24. If on receipt of a signal of completion of insertion and take-out of the card from the card reader 20 the card data are not in agreement with the stored data and if the electric lock 10 is not normally operated by the drive signal, an alarm signal will be sent to the display zone 24 of the card reader 20 by the main controller 30 to, for example, light a red lamp in the display zone 24 of the card reader 20 or to actuate a speaker or buzzer.

An automatic locking function may be given to the main controller 30. More specifically, a change-over switch is disposed in the main controller 30 so that a locking signal is transmitted to the electric lock 10 in the closed state by the change-over of this switch.

Moreover, the main controller 30 can emit a signal for operating the circuit breaker 40 and the gas disconnector 50 in a manner as described hereinafter, to the subsidiary controller 60 through a buffer signal converting circuit 39 on receipt of the normal operation signal from the electric lock 10. Further, the main controller 30 can receive a signal of confirmation of the normal operation of the circuit breaker 40 and the gas disconnector 50 from the subsidiary controller 60 and can display this signal on the display zone 24 of the card reader 20.

Figure 4:
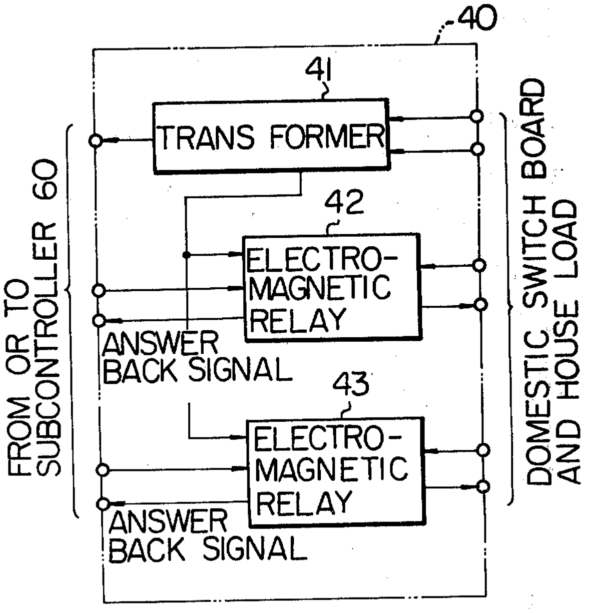
FIG. 4 is a block diagram illustrating one embodiment of the circuit breaker that is used in the safety lock system shown in FIG. 1.

For example, as illustrated in the block diagram of FIG. 4, the circuit breaker 40 can entirely intercept or restore a commercial power source used in the region such as a house or the like on receipt of the above-mentioned control signal from the subsidiary controller 60. Namely, a power circuit is intercepted or restored by the opening or closing of an electromagnetic relay 42 controlled by the above-mentioned control signal from the subsidiary controller 60. Furthermore, the circuit breaker 40 is arranged so that an answer-back signal such as the above-mentioned normal operation signal indicating the intercepted or restored state of the power circuit is fed back to the subsidiary controller 60. If another electromagnetic relay 43 is additionally disposed, another electric circuit to be controlled for interception or restoration can be formed. Also, in connection with the structure of the gas disconnector 50, various modifications may be considered.

Figure 5:
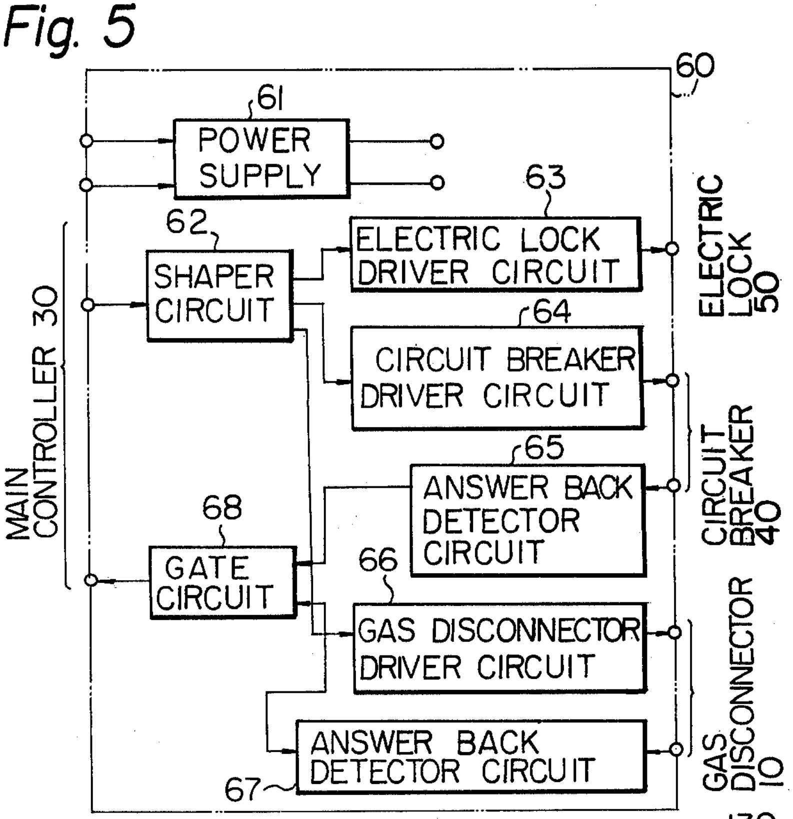
FIG. 5 is a block diagram illustrating one embodiment of the subsidiary controller that is used in the safety lock system shown in FIG. 1.

The subsidiary controller 60 is disposed to control the circuit breaker 40 and gas disconnector 50 on receipt of control signals from the main controller 30. As shown in the block diagram of FIG. 5, when the main controller 30 receives a signal of the normal locking operation from the electric lock 10 and emits a signal of confirmation of the normal locking operation, the subsidiary controller 60 receives this confirmation signal, and puts out an intercepting signal to the circuit breaker 40 through a waveform rectifying circuit 62 and a circuit breaker driving circuit 64 and also puts an intercepting signal to the gas disconnector 50 through the waveform rectifying circuit 62 and through a gas disconnector driving circuit 66. On the other hand, when the main controller 30 receives a normal unlocking operation signal and emits a signal of confirmation of the normal unlocking operation, the subsidiary controller 60 receives this confirmation signal, puts out a restoring signal to the circuit breaker 40 through the shaper circuit 62 and through a circuit breaker driving circuit 64, and also puts out a restoring signal to the gas disconnector 50 through the waveform rectifying circuit 62 and through the gas disconnector driving circuit 66. Thus, the subsidiary controller 60 automatically intercepts or restores the electric and gas systems in the region depending on whether or not there are persons present in the region. In the foregoing illustration, both the circuit breaker and the gas disconnector are automatically operated to the restoring side when the electric lock is unlocked. In view of properties of the gas-utilizing equipments, it is, however, preferred for safety's sake that when the electric lock 10 is unlocked, the gas disconnector be not automatically placed to the original state but the intercepted state be kept before the respective gas equipments are manually restored, while the circuit breaker is automatically placed to original state.

Further, the subsidiary controller 60 receives normal operation signals indicating the intercepted or restored state from the circuit breaker 40 and from the gas disconnector 50 and puts out a signal of confirmation of the normal operation of the circuit breaker and a signal of confirmation of the normal operation of the gas disconnector to the main controller 30 through an answer-back detecting circuit 65, a gate circuit 68, an answer-back detecting circuit 67, and the gate circuit 68, respectively, whereby the intercepted or restored states of the circuit breaker and the gas intercepting device can be displayed on, for example, the display zone of the card reader 20.

Figure 6:
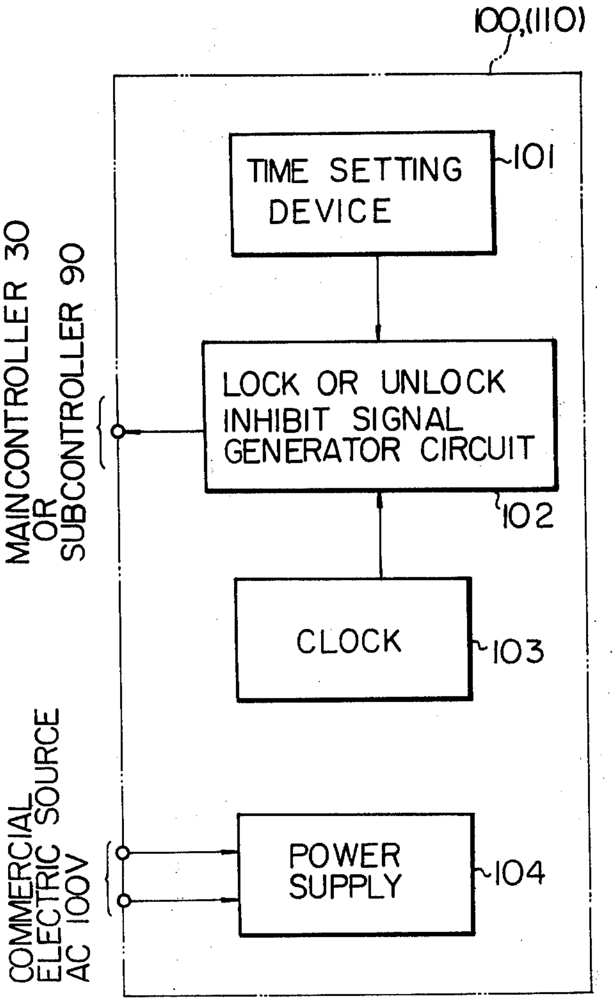
FIG. 6 is a block diagram illustrating one embodiment of the timer that is used in the safety lock system of the present invention.

When a timer 100 is associated with the main controller 30 in the embodiment shown in FIG. 1, it is possible to operate the safety lock system according to a certain time schedule. The timer 100 can be connected to the main controller 30, for example, in a manner as shown in the block diagram of FIG. 6. Each of the timers 100 comprises a time setting device 101, a locking or unlocking inhibiting signal generating circuit 102, a clock 103 and a power circuit 104. When the time zone for inhibiting the locking and unlocking operations of the door of the safety lock system is set by the time setting device 101, on receipt of signals indicating the time (for example, the time expressed in the order of up to the minute) in the time zone from the clock 103, a signal inhibiting locking or unlocking is transmitted from the locking or unlocking inhibiting signal generating circuit 102 to the main controller 30. When this locking or unlocking inhibiting signal is generated, even if a predetermined card is inserted into the card reader 20, the electric key 10 cannot be locked or unlocked and the system is kept inoperative.

Figure 7:
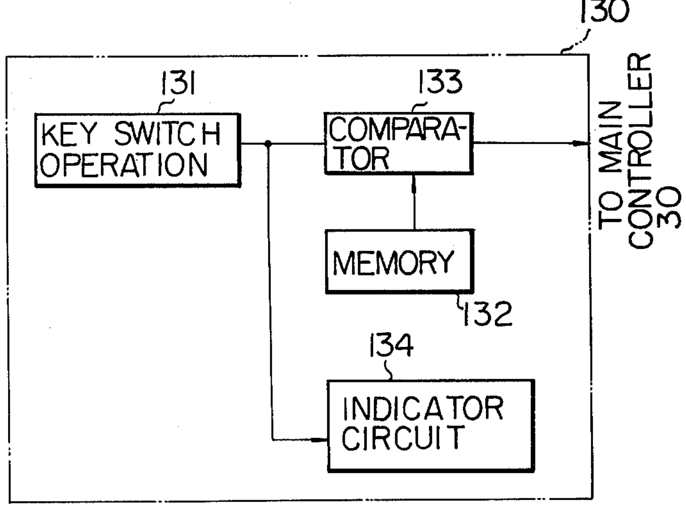
FIG. 7 is a block diagram illustrating one embodiment of the ten-key device that is used in the safety block system of the present invention.

When a ten-key device 130 is associated with the safety lock system shown in FIG. 1 it is possible to operate the system only when a specific key word is given. Any type of known ten-key devices can be used so far as the chosen device can put out a signal only when a specific key word is given for the operation. As shown in FIG. 7, a code operated by a key switch operated device 131 is sent to a comparator 133 where such code is compared with the code stored in the memory. The output of the matcher 133 is sent to the main controller 30. At the same time, the code operated by the key switch operation device 131 is displayed in the indicator circuit 134.

Figure 8:
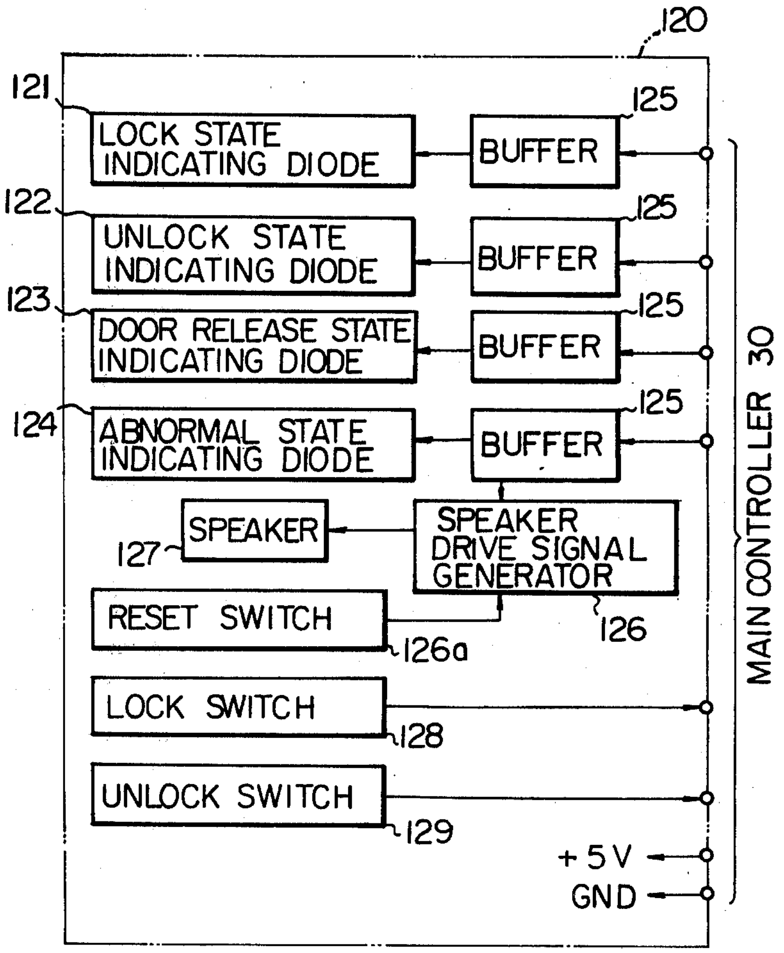
FIG. 8 is a block diagram illustrating one embodiment of the display operation device that is used in the safety lock system of the present invention.

In the embodiment shown in FIG. 1, if another electric lock 140 is associated with the subsidiary controller 60, locking and unlocking operations of this electric lock 140 can be controlled in response to a signal from the main controller 30 through the waveform rectifying circuit 62 and electric lock drive circuit 63 (see FIG. 5) of the subsidiary controller 60 in the same manner as described hereinbefore with respect to related operations of the electric lock 10, card reader 20 and main controller 30. Moreover, in the embodiments shown in FIG. 1, a display operation device 120 associated with the main controller 30 may be disposed in the region within the door. By provision of this display operation device 120, of the electric lock and remote control operation and concentrated inspection of the door are made possible. For example, as shown in the block diagram of FIG. 8, this display operation device 120 comprises a luminous diode 121 indicating the locked state, a luminous diode 122 indicating the unlocked state, a luminous diode 123 indicating the open state of the door, a luminous diode 124 indicating the abnormal state, a buffer circuit 125, an alarm signal generating circuit 126, a reset switch **126*a*, a speaker 127, a locking switch 128 and an unlocking switch 129. The locking switch 128 and unlocking switch 129 generate signals for performing locking and unlocking of the electric lock by remote operations. More specifically, when locking and unlocking of the electric lock are performed by remote operations, the locking switch 128 and the unlocking switch 129 are actuated. The locked state indicating diode 121, unlocked state indicating diode 122, the open door state indicating diode and the abnormal state indicating diode 124 display the locked and unlocked states of the electric lock, the open state of the door and the occurrence of a circuit disorder (breaking), respectively, in response to signals transmitted from the main controller 30 through the buffer circuit 125. When a disorder or accident takes place in the circuit, a signal is fed to the speaker 127 through the alarm signal generating circuit 126 to simultaneously actuate the speaker 127 and a buzzer. This alarm operation of the speaker 127 is stopped by the reset switch 126*a***. If an output terminal is disposed for putting out a signal to the outside when such an abnormal state occurs, this signal can be transmitted to other optional equipments (for example, a bell or a device for transmitting to the outside a signal which indicates the occurrence of an abnormal state to the outside.

The safety lock system shown in FIG. 1 may be arranged so that the gas and electric systems are intercepted only when a card is inserted into the card reader and the key is locked, and that when the key is locked by the display operation device, the gas and electric systems are not intercepted.

Figure 9:
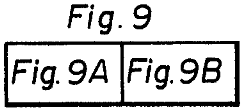
FIG. 9, which includes
Figure 9A:
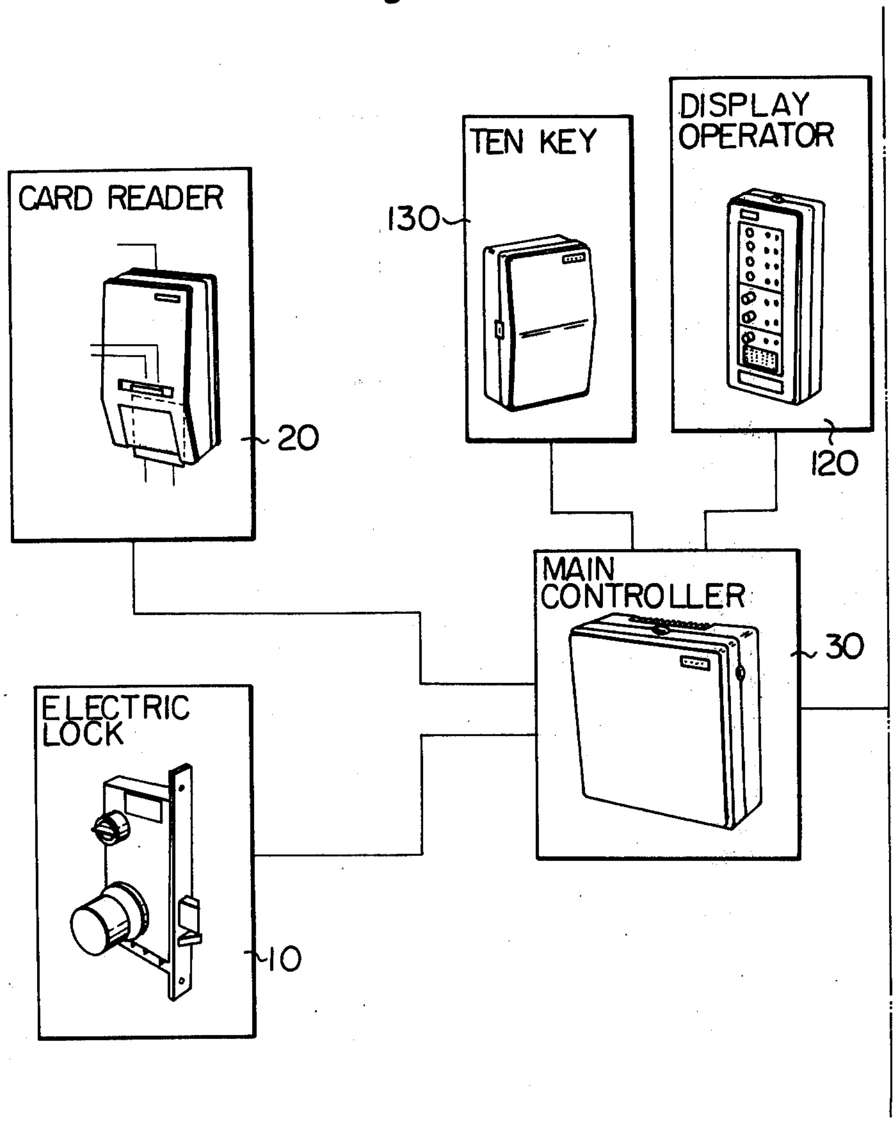
FIGS. 9A and 9B is a block diagram illustrating in a broad outline another embodiment of the safety lock system according to the present invention.
Figure 9B:
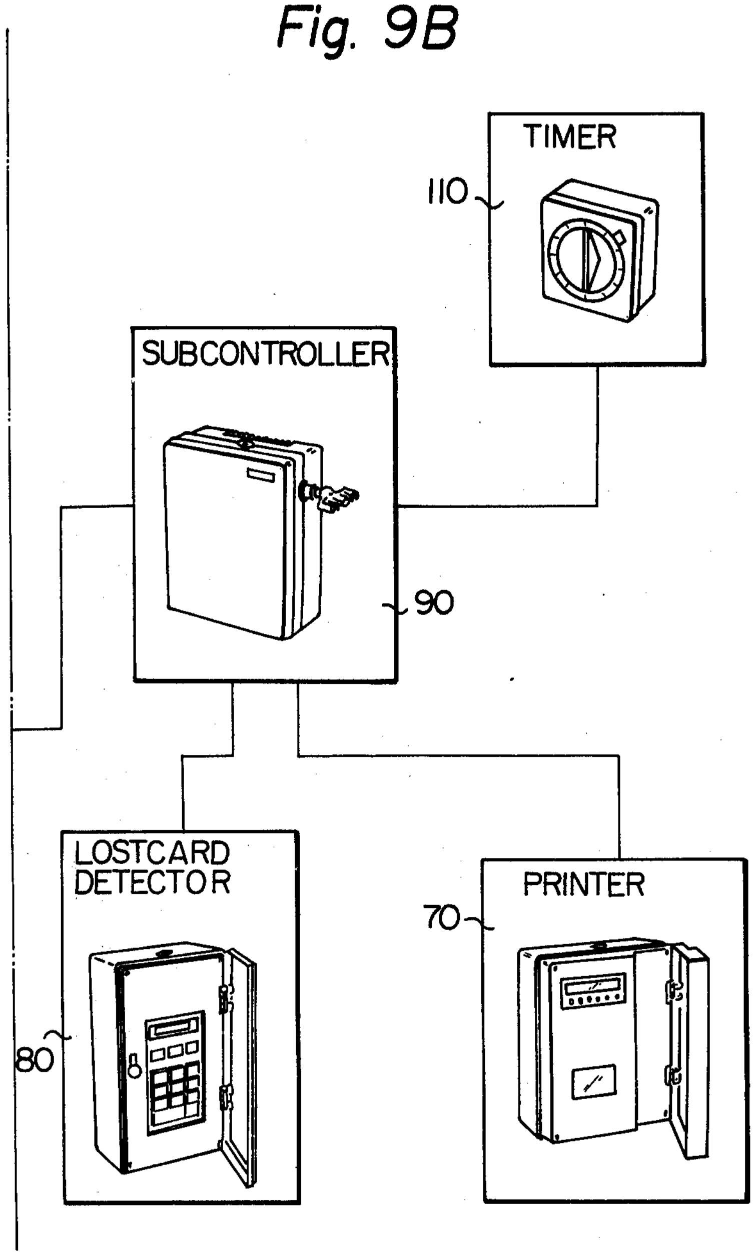

FIG. 9 is a block diagram illustrating in a broad outline another embodiment of the safety lock system of the present invention in which the locked state can be indicated and confirmed, entrance and exit of persons in a region within a door can be recorded and persons other than authorized persons are prohibited from entering into the region.

The safety lock system illustrated in FIG. 9 comprises as main constituent members an electric lock 10 mounted on a door to a certain region, a card reader 20 as a key data input device that can be operated by a person wanting to enter into or go out from the region within the door, a main controller 30 associated with the electric lock 10 and the card reader 20 for controlling their operations, a printer 70 for recording entrance and exit of persons in the region within the door, a lost card detector 80 for detecting a lost card, and a subsidiary controller 90 associated with the main controller 30 the printer 70 and the lost card ditector 80 for controlling the operations. A timer 110 is associated with the subsidiary controller 90.

The electroc lock 10, the card reader 20 and the main controller 30 perform the same functions as described hereinbefore with reference to the embodiment shown in FIG. 1 except for the points described hereinafter.

For example, in the safety lock system comprising the above-mentioned members, 1000 different kinds of cards are used for unlocking and locking, and the recorder 70 is used for recording the identification number of the person performing the locking and unlocking of the electric lock 10 and the data and time of the locking and unlocking operations. Further, for example, up to 20 personal identification numbers stored in the lost card detector 80 are discriminated so that locking and unlocking operations are prohibited by magnetic cards of such numbers or the printer 70 is not actuated by magnetic cards of said numbers.

Figure 10:
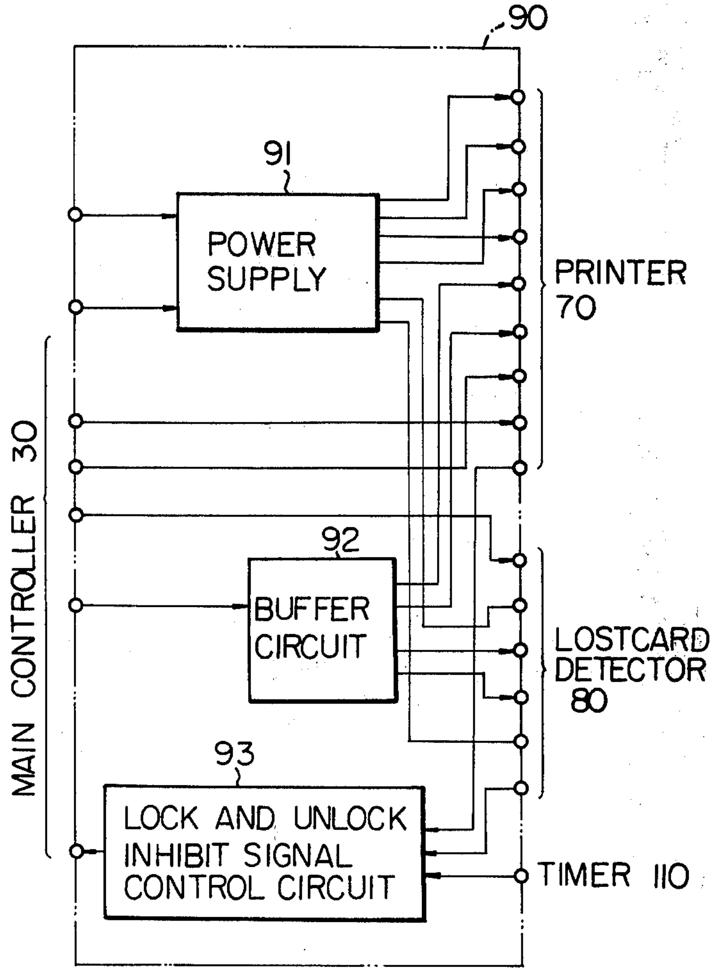
FIG. 10 is a block diagram illustrating one embodiment of the subsidiary controller that is used in the safety lock system shown in FIG. 9.

As shown in the block diagram of FIG. 10, the main controller 30 of this safety lock system transmits recorded data on the card read out by the card reader 20 to the subsidiary controller 90 through a buffer signal relay circuit 31, and the subsidiary controller 90 actuates the printer 70 and the lost card detector 80 on receipt of such data. A signal indicating the results of the processing operation in the printer 70 and the lost card detector 80 is transmitted to the main controller 30 from the subsidiary controller 90.

The subsidiary controller 90 supplies a direct electric power current to the printer 70 and to the lost card detector 80 and relays signals between the main controller 30 and the printer 70 or the lost card detector 80. For example, as illustrated in the block diagram of FIG. 10, the subsidiary controller 90 comprises a power source circuit 91 for supplying a direct electric power current to the printer 70 and the lost card detector 80, a buffer circuit 92 for relaying a person discriminating code from the main controller 30 to the printer 70 and to the lost card detector 80, and a locking or unlocking inhibiting signal controlling circuit 93 for transmitting to the main controller 30 a signal for stopping the locking or unlocking operation based on the results of the checking operation performed by the lost card detector 80 or in response to a stop signal from the printer 70.

Figure 11:
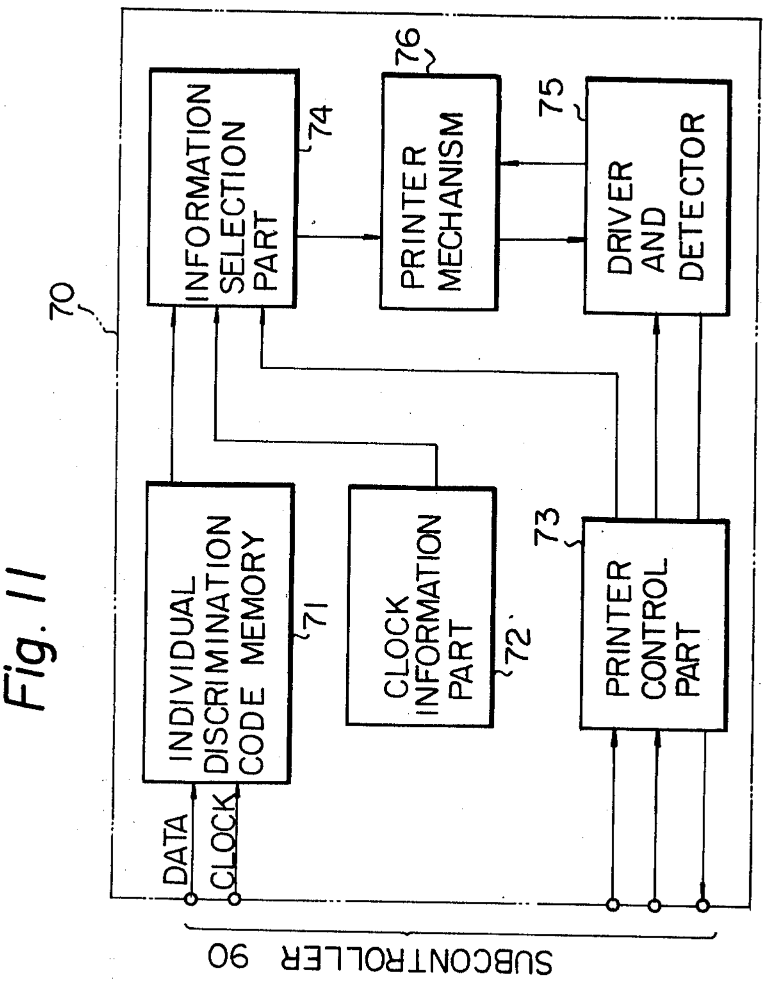
FIG. 11 is a block diagram illustrating one embodiment of the printer that is used in the safety lock system shown in FIG. 9.

When locking or unlocking of the electric lock 10 is performed, the printer 70 prints on a recording paper the data of a person discriminating code recorded on the magnetic card and other similar data together with information of the month, day, hour and minute of the locking or unlocking operation. For example, as shown in the block diagram of FIG. 11, the printer 70 comprises a individual discriminating code memory 71, a clock information part 72, a printer control part 73, an information selecting part 74, a driver and detector 75, and a printing mechanism 76. The operations of this printer 70 will now be described.

When the printer 70 receives data such as a person discriminating code of the card inserted into the card reader 20, and a signal of confirmation of the normal locking or unlocking operation of the electric lock 10, which are transmitted from the main controller 30 through the subsidiary controller 90 as described hereinafter, the printer 70 is actuated to automatically record on a recording paper such data together with the time information (information of the month, day, hour and minute) emitted from the clock information part 72, which can be seen with the naked eye if a quarts crystal oscillator system is adopted into the present invention. For example, in the case of the unlocking operation these data are printed in red, and in the case of the locking operation these data are printed in black by means of the printing mechanism zone 76.

Figure 12:
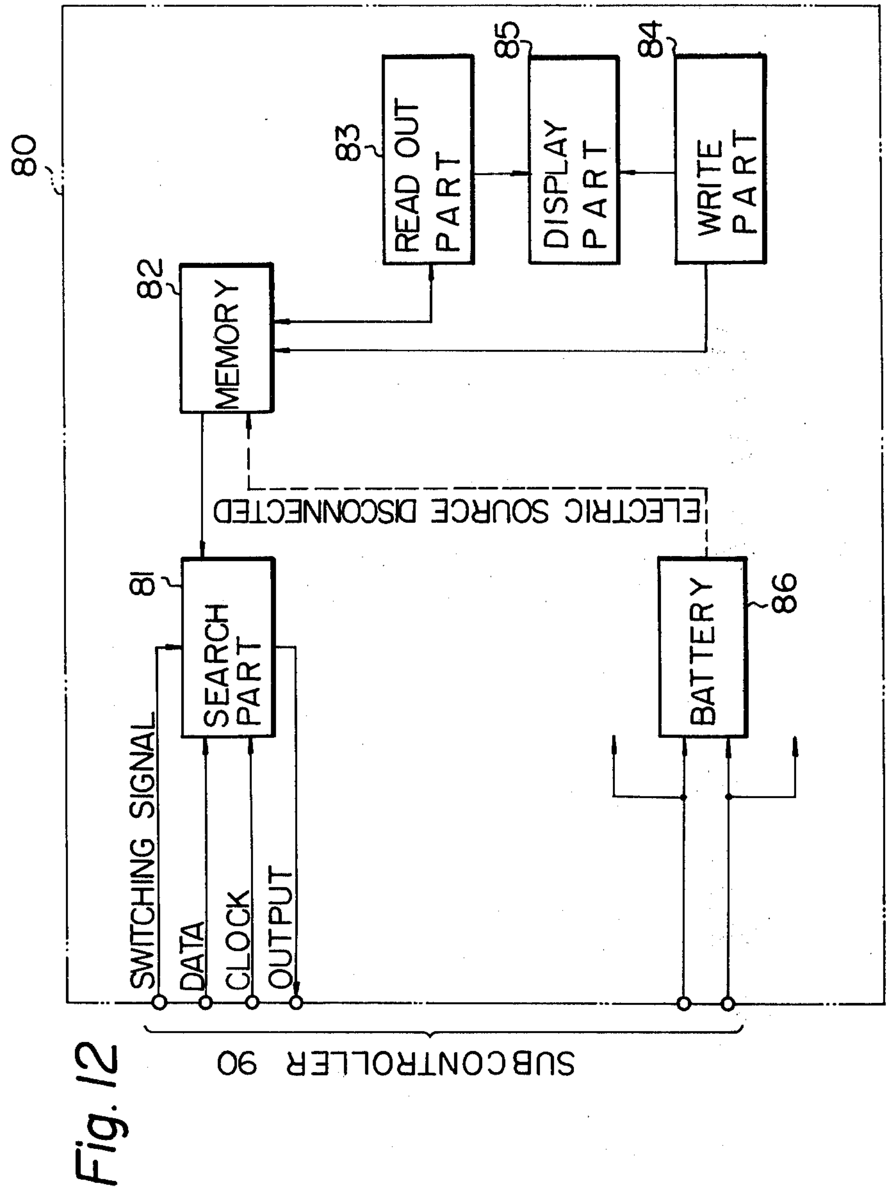
FIG. 12 is a block diagram illustrating one embodiment of the lost card detector that is used in the safety lock system shown in FIG. 9.

As pointed out hereinbefore, the lost card detector 80 is connected to the subsidiary controller 90 to prohibit the unauthorized operation of the system by the use of a lost card. For example, as shown in the block diagram of FIG. 12, the lost card detector 80 comprises a searching part 81, a store part 82, a read-out part 83, a writing part 84 and a display part 85.

For example, up to 20 kinds of lost cards can be manually stored in the store zone 82 through the writing zone 84, and if the store zone 82 is arranged so that written codes can be simultaneously displayed on the display part 85, the stored lost cards can be verified. It is also possible to manually erase already stored codes. Further, if a battery 86 is appropriately built in the lost card detector 80, it is possible to effectively maintain storage of the lost cards for a certain period, for example, 24 hours, after interception of the power source.

The main operations of this card detector 80 will now be described.

The detector 80 receives data such as the personal code of the card inserted in the card reader 20, which is transmitted from the main controller 30 through the subsidiary controller 90 as described hereinbefore, and it checks whether or not the data of this card are in agreement with the data of any of the lost cards stored in the store zone 82. If the data of the inserted card are in agreement with the data of any of the stored lost cards, the detector 80 transmits an agreement signal to the subsidiary controller 90 to cause the subsidiary controller 90 to emit a signal for prohibiting the locking or unlocking operation to the main controller 30 through the locking or unlocking inhibiting signal controlling circuit 93 of the subsidiary controller 90 whereby locking or unlocking of the electric lock 10 by the use of the lost card is not allowed.

Incidentally, it is preferred that various displays on the display zone 24 of the card reader 20, for example, display of the locked or unlocked state of the electric lock 10, be performed only when a card is inserted into the card reader 20.

As will be apparent from the foregoing illustration, when the key of a door is locked and unlocked according to the safety lock system of the present invention, various effects and advantages such as those mentioned below can be attained.

(1) By utilizing magnetic cards, the quantity of informations for the key can be increased over the quantity of informations obtainable in the conventional mechanical system. Therefore, the safety securing effect can be remarkably enhanced.

(2) It is possible to detect and inspect the states (locked, unlocked, open and abnormal states) of the door, and the safety can be enhanced by utilizing software operations.

(3) The system of the present invention can be connected to other remote control inspection systems, and the safety securing range can be broadened.

(4) Not only functions of locking and unlocking the lock but also functions of intercepting and restoring electric and gas systems can be performed by the present invention. Therefore, the safety factors for ordinary houses can be secured and assured on a broad basis.

(5) Locking and unlocking operations can be performed by utilizing different cards, and the discriminating number of the person performing the locking or unlocking operation and the information concerning the year, month, day and hour of the locking or unlocking operation can be recorded on a recording paper by the printer. Furthermore, discriminating numbers recorded in the lost card detector are checked so that the locking or unlocking operation and actuation of the printer are prohibited when magnetic cards of the discriminating numbers recorded in the lost card detector are used. In short, the safety lock system of the present invention can exercise not only the function of discriminating persons performing locking and unlocking operations and but also the function of recording such persons. Therefore, the safety can be secured and broadly assured in office rooms and the like where entrance and exit of all persons should be strictly checked.

What is claimed is:

1. A safety lock system comprising:

(a) lock means mounted on a gateway to an area for controlling access to the area, (b) a main controller means connected to said lock means for controlling the locking and unlocking of said lock means said main controller means including a comparator means said lock means transmitting to said main controller means a normal operation signal upon completion of said locking or unlocking;

(c) card reader means coupled to said main controller means for reading the data on a card and transmitting said data to said comparator of said main controller means wherein said data is compared to predetermined data; and (d) display means coupled to said main controller means wherein when said data from said card reader means is in agreement with said predetermined data, said main controller means transmits a locking or unlocking drive signal to said lock means, and when said data from said card reader is not in agreement with said predetermined data, said main controller means transmits a first alarm signal to said display means, and wherein when said main controller means receives a normal operation signal from said lock means, said main controller means transmits a confirmation signal to said display means, and when said main controller means does not receive a normal operation signal from said lock means, said main controller means transmits a second alarm signal to said display means.

2. A safety lock system as set forth in claim 1 further including:

(a) a subsidiary controller means coupled to said main controller means said subsidiary controller, means receiving said operation confirmation signal from said main controller means;

(b) energy control means coupled to said subsidiary controller means for controlling energy supplied to said area, wherein when said subsidiary controller means receives said lock confirmation signal, said subsidiary controller means transmits an operation signal to said energy control means for stopping or starting energy systems in said area, said energy control means transmits a normal operation signal to said subsidiary controller means upon normal operation of said energy control means and said subsidiary controller means transmits an energy control confirmation signal to said display means through said main controller means, and when said subsidiary controller means does not receive a normal operation signal from said energy control means said subsidiary controller means transmits a third alarm signal to said display means through said mean controller means.

3. A safety lock system as set forth in claim 2 wherein said energy control means is an electric circuit breaker for controlling electric power to said area.

4. A safety lock system as set forth in claim 2 wherein said energy control means is a gas disconnector for controlling the flow of gas to said area.

5. A safety lock system as set forth in claim 2 wherein said energy control means is an electric circuit breaker for controlling electric power to said area and a gas disconnector for controlling the flow of gas to said area.

6. A safety lock system as set forth in claim 5 wherein when said subsidiary controller means receives a lock confirmation signal of the unlocking of said lock means, said subsidiary controller means transmits a start signal only to said circuit breaker.

7. A safety lock system as set forth in claim 1 further including:

(a) a subsidiary controller means coupled to said main controller means; and (b) lost card detector means coupled to said subsidiary controller means, wherein said lost card detector means compares the data on said cards to lost card data stored therein and when said data on said card coincides with said lost card data, said lost card detector means transmits an agreement signal to said subsidiary controller means and said subsidiary controller means transmits a locking or unlocking inhibit signal to said main controller means.

8. A safety lock system as set forth in claim 1 further including a keyboard means including a second comparator means coupled to said main controller means, data being entered into said system by operation of said keyboard means, wherein said second comparator means compares the data entered into said system with predetermined data.

9. A safety lock system as set forth in claim 8 further including:

(a) a subsidiary controller means coupled to said main controller means said subsidiary controller means receiving said operation confirmation signal from said main controller means;

(b) energy control means coupled to said subsidiary controller means for controlling energy supplied to said area, wherein when said subsidiary controller means receives said lock confirmation signal, said subsidiary controller means transmits an operation signal to said energy control means for stopping or starting energy systems in said area, said energy control means transmits a normal operation signal to said subsidiary controller means upon normal operation of said energy control means and said subsidiary controller means transmits an energy control confirmation signal to said display means through said main controller means, and when said subsidiary controller means does not receive a normal operation signal from said energy control means said subsidiary controller means transmits a third alarm signal to said display means through said means controller means.

10. A safety lock system as set forth in claim 9 wherein said energy control means is an electric circuit breaker for controlling electric power to said area.

11. A safety lock system as set forth in claim 9 wherein said energy control means is a gas disconnector for controlling the flow of gas to said area.

12. A safety lock system as set forth in claim 9 wherein said energy control means is an electric circuit breaker for controlling electric power to said area and a gas disconnector for controlling the flow of gas to said area.

13. A safety lock system as set forth in claim 12 wherein when said subsidiary controller means receives a lock confirmation signal of the unlocking of said lock means, said subsidiary controller means transmits a start signal only to said circuit breaker.

14. A safety lock system as set forth in claim 8 further including:

(a) a subsidiary controller means coupled to said main controller means; and (b) lost card detector means coupled to said subsidiary controller means, wherein said lost card detector means compares the data on said cards to lost card data stored therein and when said data on said card coincides with said lost card data, said lost card detector means transmits an agreement signal to said subsidiary controller means and said subsidiary controller means transmits a locking or unlocking inhibit signal to said main controller means.

15. A safety lock system as set forth in claim 1 including timer means coupled to said main controller means for applying a locking and unlocking inhibiting signal to said main controller means for a predetermined period of time.

16. A safety lock system as set forth in claim 8 including timer means coupled to said main controller means for applying a locking and unlocking inhibiting signal to said main controller means for a predetermined period of time.

17. A safety lock system as set forth in claim 1 wherein said main controller means comprises:

(a) a buffer means coupled between said card reader means and said comparator means;

(b) a memory means coupled to said comparator means, said predetermined data being stored in said memory means;

(c) signal synthesizer means coupled to the output of said comparator means;

(d) signal controller means coupled to the output of said signal synthesizer;

(e) lock and unlock signal generator means coupled to the output of said signal synthesizer, for applying a lock and unlock signal to said lock means; and (f) locking state discriminator means coupled to said lock means for determining if said lock means operates normally in response to locking and unlocking signals from said main controller means.

18. A safety lock system as set forth in claim 1 wherein said card reader means comprises:

(a) a card insertion detecting means for detecting the insertion of said card into said card reader means; and (b) card code reader means for reading the data on said card, wherein said card insertion detecting means and said card code reader means are coupled to said main controller means.

19. A safety lock system as set forth in claim 2 wherein said subsidiary controller means comprises:

(a) energy control means driver means having an input coupled to said main controller means and an output coupled to said energy control means; and (b) answer back detector means for detecting the normal operation of said energy control means, said answer back detector means having an input coupled to said energy control means and an output coupled to said main controller means.

20. A safety lock system as set forth in claim 8 wherein said main controller means comprises:

(a) a buffer means coupled between said card reader means and said comparator means;

(b) a memory means coupled to said comparator means, said predetermined data being stored in said memory means;

(c) signal synthesizer means coupled to the output of said comparator means and to the output of said second comparator means;

(d) signal controller means coupled to the output of said signal synthesizer;

(e) lock and unlock signal generator means coupled to the output of said signal synthesizer, for applying a lock and unlock signal to said lock means; and (f) locking state discriminator means coupled to said lock means for determining if said lock means operates normally in response to locking and unlocking signals from said main controller means.

21. A safety lock system as set forth in claim 8 wherein said card reader means comprises:

(a) a card insertion detecting means for detecting the insertion of said card into said card reader means; and (b) card code reader means for reading the data on said card, wherein said card insertion detecting means and said card code reader means are coupled to said main controller means.

22. A safety lock system as set forth in claim 9 wherein said subsidiary controller means comprises:

(a) energy control means driver means having an input coupled to said main controller means and an output coupled to said energy control means; and (b) answer back detector means for detecting the normal operation of said energy control means, said answer back detector means having an input coupled to said energy control means and an output coupled to said main controller means.

* * * * *